Figure 2:
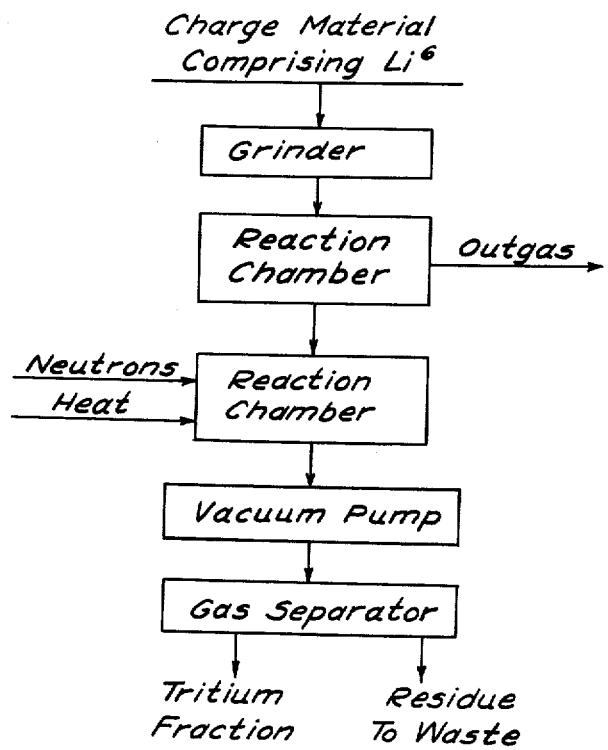

Feb. 26, 1963
G. H. JENKS ET AL
3,079,317
PRODUCTION OF TRITIUM
Filed April 29, 1949
2 Sheets-Sheet 1
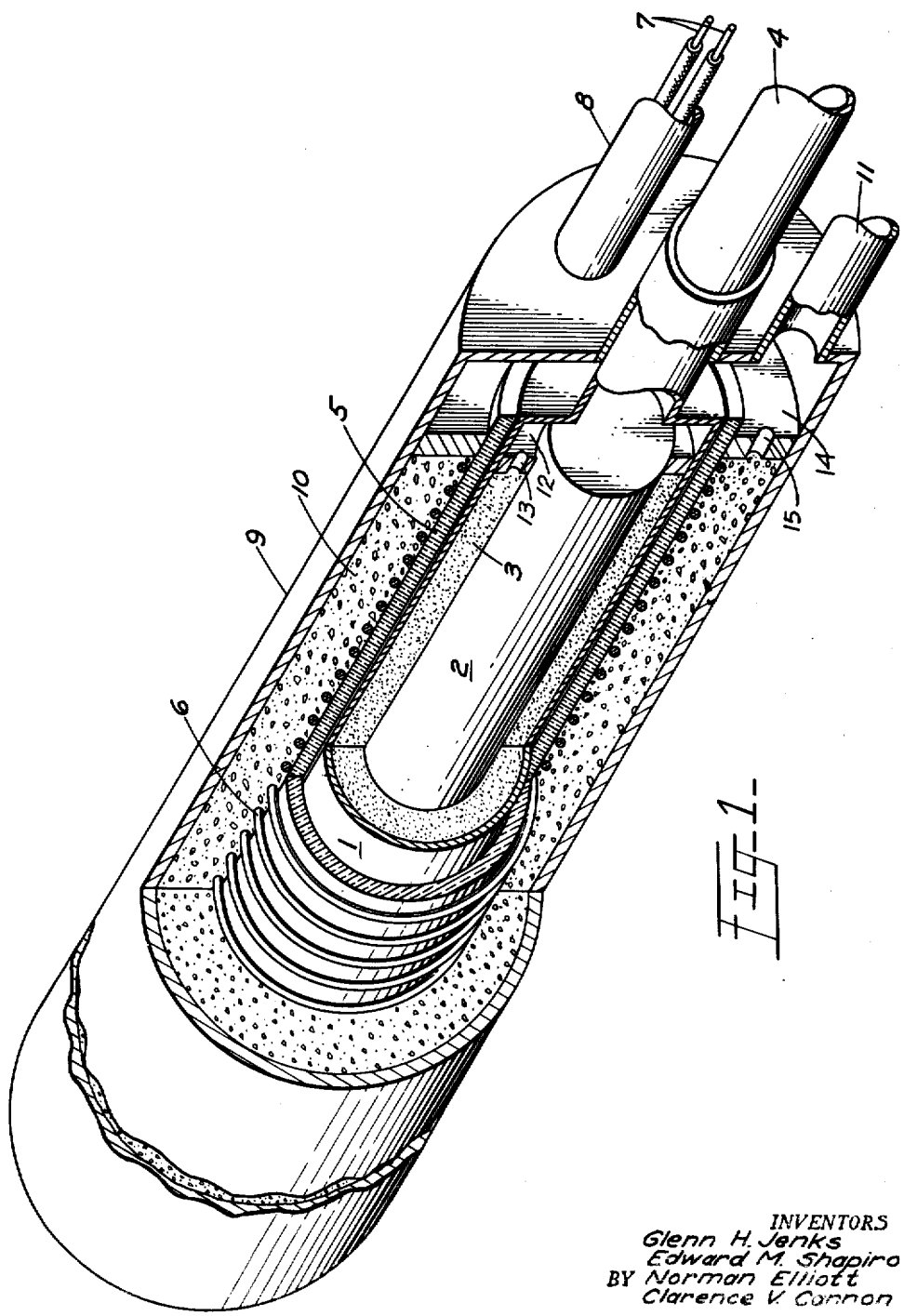
_Fig-1_
INVENTORS
Glenn H. Jenks
Edward M. Shapiro &
BY Norman Elliott
Clarence V. Cannon
Roland G. Anderson
ATTORNEY INVENTORS
Glenn H. Jenks
Edward M. Shapiro
BY Norman Elliott &
Clarence V. Cannon

United States Patent Office 3,079,317
Patented Feb. 26, 1963

3,079,317
PRODUCTION OF TRITIUM
Glenn H. Jenks, Oak Ridge, Tenn., Edward M. Shapiro, Springfield Township, Delaware County, Pa., Norman Elliott, Bluepoint, N.Y., and Clarence Vernon Cannon, Bothell, Wash., assignors to the United States of America as represented by the United States Atomic Energy Commission
Filed Apr. 29, 1949, Ser. No. 90,512
5 Claims. (Cl. 204—154.2)

This invention relates in general to a method for producing tritium, and more particularly to a continuous process for the production of tritium involving neutron irradiation of lithium.

Tritium is the isotope of hydrogen having an atomic mass number of 3. Being radioactive, it is valuable for use of a tracer in the study of various reactions involving hydrogen.

It is known that tritium may be produced by neutron bombardment of the lithium isotope of mass number 6 in accordance with the (n,γ) reaction:

$$_3Li^6 + _0n^1 \rightarrow {_1H^3} + {_2He^4}$$

Prior to this invention, microscopic amounts of tritium had been made with this reaction by the neutron bombardment of masses of lithium metal. After irradiation, the minute amounts of produced tritium were recovered by dissolving the lithium in water; the tritium within the metal was thereby evolved together with large quantities of ordinary hydrogen generated by the dissolution. After separation from other gaseous contaminants, the final product was thus hydrogen gas, only a minute proportion of which comprised the tritium.

While tritium can be used in such an extremely dilute condition, it is very desirable for most applications that it be provided in a form as concentrated with respect to the other hydrogen isotopes as possible. As it is not feasible to attempt to separate tritium from the other hydrogen isotopes once they are admixed, new methods which would afford production of tritium in high concentration have been greatly desired. The present invention provides such a method.

One object of this invention, therefore, is to provide a new and improved method for the production of tritium.

Another object is to provide such a method wherein the ratio of tritium to other hydrogen isotopes in the product is considerably higher than in methods heretofore conventional, and one wherein the contamination of tritium by foreign gases is minimized during its production.

Still another object is to provide such a method for efficiently producing practical, macroscopic amounts of tritium.

A further object is to provide a continuous process for tritium production, particularly one from which tritium is obtainable at a substantially constant rate over a long period of time.

In accordance with the present invention, tritium is produced by subjecting a comminuted, solid material comprised of the lithium isotope of atomic mass number 6, disposed within a substantially vacuum-tight container, to neutron irradiation, while maintaining the container substantially completely evacuated of free gases and concomitantly removing from the container free gaseous irradiation products, including tritium and helium, as they are formed, and then recovering tritium from the removed gaseous irradiation products. In conducting this process, it is preferred that the irradiation and evacuation operations be effected continuously, and that the comminuted material be maintained at an elevated temperature during irradiation to facilitate the release of the gaseous products therefrom.

In the appended drawings:
FIGURE 1 is a diagrammatical illustration of preferred apparatus for conducting the present process; and
FIGURE 2 is a self-explanatory flow sheet of the process.

The preferred apparatus diagrammatically illustrated in FIGURE 1 was devised for advantageously conducting this process. The figure shown is a cut-away, perspective view of a tritium-generating apparatus adapted for insertion in a self-sustaining neutronic reactor, the preferred source of neutron radiation. Referring to FIGURE 1, a substantially vacuum-tight, cylindrical container 1, concentrically containing a smaller, open, cylindrical canister 2, confines a comminuted lithium material 3 in the annulus surrounding the canister 2. Such annular distribution of the lithium, affording better gas removal, is preferred, since most of the reaction takes place in the outer layers of the irradiated material. A gas withdrawal pipe 4 leads from the container 1 to conventional vacuum-pumping and gas-receiving means (not shown). For vacuum pumping, a mercury diffusion pump is satisfactory. The container 1 is jacketed with a heater comprising a ceramic sleeve 5 having electrical resistance wire 6 wound thereon. Electric leads 7 for the resistance wire are introduced through a conduit 8. A substantially vacuum-tight, concentric, cylindrical shell 9 encases the apparatus, and the annulus formed between the shell and the heater is packed with thermal insulation 10. A vacuum line 11 leads from the annulus between the container 1 and the shell 9 to a separate vacuum pump (not shown). As may be seen in the drawing, there are perforated baffles in the annuli between canister 2 and container 1, and between ceramic sleeve 5 and shell 9, by which the concentric members are conveniently positioned and the materials disposed in the two annuli are retained. Near each extremity of the appartus, a perforated baffle 12 having at least one aperture 13 retains lithium material 3 in the inner of the two annuli, and a perforated baffle 14 having at least one aperture 15 retains thermal insulation 10 in the outer one. The materials of construction used should preferably have a low neutron absorption cross section. For example, aluminium for the canister 2, container 1, and shell 9, Alundum for the sleeve 5, and alumina for the thermal insulation 10 are satisfactory for the purpose. The use of alumina, an efficient neutron moderator, for the rather thick thermal insulation affords an additional advantage in that it slows down the faster neutrons to the more effective slower energy levels before they reach the lithium.

In operation, the apparatus is placed in a flux of neutrons, the heater is turned on, and both container 1 and the annulus between it and the shell 9 are initially outgassed by the separate vacuum-pumping means provided. Alternatively, the apparatus might be outgassed before being placed in the neutron flux, but then upon commencement of irradiation further outgassing is usually necessary to remove additional gas released by radiation effects. After completion of outgassing, the container 1 is maintained substantially completely evacuated of free gases and at an elevated temperature while the irradiation proceeds. Generated tritium, along with the helium by-product, diffuses out of the lithium material as it is formed, and is withdrawn through gas withdrawal pipe 4 to the gas-receiving means by vacuum pumping. The generated tritium may be pumped out continuously, although periodic withdrawal, for example by a daily short pumping period, is entirely satisfactory. With constant operating conditions, once equilibrium is established, the apparatus produces tritium at a substantially constant rate over a long period of time. The annulus between the container 1 and the shell 9 is maintained at a high vacuum throughout the operation to prevent the diffusion of contaminating atmospheric gases in through the walls of the container 1.

It is desirable that the comminuted lithium-containing material used in this process be non-hydrogenous, non-hygroscopic, and not subject to thermal decomposition at the temperatures at which the reaction is conducted, and that any constituents other than lithium have low neutron absorption cross sections. Lithium fluoride, eminently satisfying all of these criteria, is the preferred reactant; various other lithium salts, for example the carbonate and nitrate, and metallic lithium are also suitable. Although naturally-occurring lithium has an isotopic proportion of the tritium-productive $Li^6$ of only 7.9%, it is quite satisfactory for the present process; therefore, while the use of isotopically-enriched lithium would be beneficial, it is not necessary.

Generally speaking, the higher the operating temperature, the better, since tritium's propensity to diffuse from the lithium material increases with increase in temperature. A significant temperature criticality was observed in the case of lithium fluoride; the rate of evolution of tritium adsorbed therein sharply and markedly decreases at approximately 450° C. It is consequently advantageous that this critical temperature be exceeded when lithium fluoride is used.

The withdrawn gases comprise predominantly the tritium and helium transmutation products, and ordinarily some protium ($_1H^1$ isotope) supposedly originating primarily from water residual after outgassing in the lithium material. When convenient quantities thereof have been collected, the hydrogen isotopes may be isolated virtually free from all other gases by diffusion through a palladium valve conventional in the art (cf. "Scientific Foundations of Vacuum Technique," by S. Dushman, pages 607 et seq., especially pages 611–612 and 614, John Wiley, 1949). A palladium valve, comprising a barrier of metallic palladium about 1/32 inch thick, permits hydrogen to pass therethrough while blocking the passage of helium and other gases.

The efficacy of this process is illustrated by the following specific example.

*Example*

780 grams of chemically pure lithium fluoride (lithium of normal isotopic proportion, i.e. 7.9% $_3Li^6$) was sintered, comminuted to 30 U.S. mesh, and placed within the apparatus illustrated in the appended drawing. The long, slender, tubular apparatus was then inserted in an operating neutronic reactor at a place where the average flux density was of the order of $10^{11}$ neutrons per square centimeter per second. The temperature of the system was elevated and maintained, with the heater, at approximately 470° C. during the entire run. Substantially continuous operation of a mercury diffusion pump effected a week-long initial outgassing of the lithium fluoride and its container, and thereafter, while it maintained the pressure at about $10^{-5}$ mm. Hg, withdrew the produced gases, as they were formed, to the gas-receiving means. Production was continued over a period of several months. The produced gases consisted of approximately one part tritium, one part protium, and two parts helium (molar ratio), with traces of nitrogen and oxygen. The hydrogen isotopes were isolated by diffusion through a palladium valve, maintaining the mixed gases at atmospheric pressure on one side of the barrier, while maintaining high vacuum on the other. The resulting product was analyzed to be about 50% (atomic percentage) tritium and 50% protium. During the run, tritium (calculated as $_1H_2^3$) was recovered at the rate of approximately 0.28 cubic centimeter (corrected to a pressure of one atmosphere and 0° C.) per 24 hours of irradiation. This rate was about 32% of the estimated rate of transmutation to tritium theoretically calculated on the basis of radiation utilized. After withdrawing the apparatus from the reactor, much of the tritium remaining adsorbed in the lithium fluoride upon completion of the run was recoverably released by heating the salt to above 600° C. in a furnace.

For further details concerning the theory, design, construction and operation of self-sustaining neutronic reactors for effecting said neutron irradiation, cross reference is made to the following United States patent which has issued upon a formerly co-pending application of the common assignee: U.S. 2,708,656, May 17, 1955, E. Fermi et al., Neutronic Reactor, application Ser. No. 568,904, filed December 19, 1944.

It is to be understood that all matters contained in the above description are illustrative only and do not limit the scope of this invention as it is intended to claim the invention as broadly as possible in view of the prior art.

What is claimed is:

1. In a process for the production of tritium by neutron-induced transmutation from the lithium isotope of atomic mass number 6, the improved procedure which comprises subjecting a comminuted, solid non-hydrogenous material comprised of the said lithium isotope, disposed within a substantially vacuum-tight container, to neutron irradiation, while maintaining the said container substantially completely evacuated of free gases and concomitantly removing from the said container free gaseous irradiation products, including tritium, as they are formed, and thereupon separating the hydrogen content, including tritium, of the so-removed gases by selective diffusion of said hydrogen through a barrier of palladium.

2. In a process for the production of tritium by neutron-induced transmutation from the lithium isotope of atomic mass number 6, the improved procedure which comprises subjecting a comminuted, solid non-hydrogenous material comprised of the said lithium isotope, disposed within a substantially vacuum-tight container, to neutron irradiation, while maintaining said material heated, and while maintaining the said container substantially completely evacuated of free gases and concomitantly removing from the said container free gaseous irradiation products, including tritium, as they are formed, and thereupon separating the hydrogen content, including tritium, of the so removed gases by selective diffusion of said hydrogen through a barrier of palladium.

3. In a process for the production of tritium by neutron-induced transmutation from the lithium isotope of atomic mass number 6, effected by irradiation with neutrons from a self-sustaining neutronic reactor, the improved procedure which comprises subjecting comminuted, solid non-hydrogenous lithium salt comprised of the said lithium isotope, disposed within a substantially vacuum-tight container, to said irradiation with neutrons, while maintaining said salt heated, and while maintaining the said container substantially completely evacuated of free gases and concomitantly removing from the said container free gaseous irradiation products, including tritium, as they are formed, and thereupon separating the hydrogen content, including tritium, of the so removed gases by selective diffusion of said hydrogen through a barrier of palladium.

4. In a process for the production of tritium by neutron-induced transmutation from the lithium isotope of atomic mass number 6, the improved procedure which comprises subjecting comminuted, solid lithium fluoride, comprised of the said lithium isotope, disposed within a substantially vacuum-tight container, to neutron irradiation while maintaining the said container substantially completely evacuated of free gases and concomitantly removing from the said container free gaseous irradiation products, including tritium, as they are formed, and thereupon separating the hydrogen content, including tritium, of the so removed gases by selective diffusion of said hydrogen through a barrier of palladium.

5. In a process for the production of tritium by neutron-induced transmutation from the lithium isotope of atomic mass number 6, effected by irradiation with neutrons from a self-sustaining neutronic reactor, the improved procedure for affording continuous tritium production which comprises subjecting comminuted, solid lithium fluoride comprised of the said lithium isotope, disposed within a substantially vacuum-tight container, to said irradiation with neutrons, while maintaining said lithium fluoride heated at least as hot as 450° C., and while maintaining the said container substantially completely evacuated of free gases and concomitantly removing from the said container free gaseous irradiation products, including tritium, as they are formed, and thereupon separating the hydrogen content, including tritium, of the so removed gases by selective diffusion of said hydrogen through a barrier of palladium.

References Cited in the file of this patent

UNITED STATES PATENTS

| | | |
|---|---|---|
| 1,576,083 | Boyer | Mar. 9, 1926 |
| 1,648,962 | Rentschler et al. | Nov. 15, 1927 |
| 2,163,224 | Alexander | June 20, 1939 |
| 2,206,634 | Fermi et al. | July 2, 1940 |

FOREIGN PATENTS

| | | |
|---|---|---|
| 233,011 | Switzerland | Oct. 2, 1944 |

OTHER REFERENCES

Chemical Abstracts, vol. 37, p. 2987 (1943). Abstract of Berger Article.

Lapp and Andrews: Nuclear Radiation Physics, page 338, Prentice-Hall (1948).

Chadwick et al.: "Disintegration by Slow Neutrons," Nature, vol. 135, p. 65 (1935).

Norris et al.: Science, vol. 105, No. 2723, pages 265–267, Mar. 7, 1947.

Novick, MDDC–1236, U.S. Atomic Energy Commission, August 26, 1947, 1 page.

H. D. Smyth: "A General Account of the Development of Methods of Using Atomic Energy," pub. August 1945, pages 20, 22, 152, 153.